US008037426B2

(12) United States Patent
Kim (10) Patent No.: US 8,037,426 B2
(45) Date of Patent: Oct. 11, 2011

(54) METHOD OF GENERATING A GUIDANCE ROUTE TO A TARGET MENU AND IMAGE PROCESSING APPARATUS USING THE SAME

(75) Inventor: Chang-sun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1468 days.

(21) Appl. No.: 11/462,137

(22) Filed: Aug. 3, 2006

(65) Prior Publication Data

US 2007/0079284 A1 Apr. 5, 2007

(30) Foreign Application Priority Data

Oct. 4, 2005 (KR) ........................ 10-2005-0093084

(51) Int. Cl.
*G06F 13/00* (2006.01)
*G06F 15/00* (2006.01)

(52) U.S. Cl. ........................................ 715/867; 715/744
(58) Field of Classification Search .......... 715/851–853, 715/763–765, 840–843, 867, 744
See application file for complete search history.

(56) References Cited

U.S. PATENT DOCUMENTS 6,538,697 B1 * 3/2003 Honda et al. ............. 348/333.03
2004/0223001 A1 * 11/2004 Peng ............................ 345/619

FOREIGN PATENT DOCUMENTS

| JP | 2004-260660 | 9/2004 |
| KR | 2001-54613 | 7/2001 |
| WO | 98/47063 | 10/1998 |

* cited by examiner

*Primary Examiner* — Cao "Kevin" Nguyen
(74) *Attorney, Agent, or Firm* — Stanzione & Kim, LLP (57) ABSTRACT

A method of guiding a menu, including storing route information generated based on hierarchical relationships of menus according to a tree structure, and displaying menu items using an on screen display and displaying a location and a function of a menu a user would like to find through a simulated menu using route information.

21 Claims, 6 Drawing Sheets

METHOD OF GENERATING A GUIDANCE ROUTE TO A TARGET MENU AND IMAGE PROCESSING APPARATUS USING THE SAME

CROSS-REFERENCE TO RELATED APPLICATIONS

This application claims priority under 35 U.S.C. §119(a) from Korean Patent Application No. 2005-93084, filed Oct. 4, 2005, in the Korean Intellectual Property Office, the content of which is incorporated herein by reference in its entirety.

BACKGROUND OF THE INVENTION

1. Field of the Invention

The present general inventive concept relates to a method of generating a route to a target menu and a image processing apparatus using the same. More particularly, the present general inventive concept relates to a method of generating a route to a target menu, which displays a location of the target menu using an on-screen display, and a image processing apparatus using the same.

2. Description of the Related Art

A television, which is a type of image processing apparatus, receives a broadcast signal from a broadcasting station, displays a image, and outputs a sound corresponding to the broadcast signal. The television is connected to an external device, such as a digital video disk (referred to as a 'DVD') player, a set-top box, or a computer, to display a variety of images.

Manufacturers of electronic devices (including the television) typically provide an instruction manual or manual compact disk (CD) that gives detailed descriptions about respective functions of menus for a user's convenience. However, in order to use the instruction manual or manual CD, the user has to read the manual or execute the manual CD, which is a troublesome and ineffective amount of work. Also, since the instruction manual or manual CD is provided in a separate package from the electronic devices (including the television), they are likely to be lost and thus maintenance of the electronic devices is inconvenient.

SUMMARY OF THE INVENTION

The present general inventive concept provides a method of generating a route to a target menu to improve a user's convenience.

The present general inventive concept also provides a image processing apparatus performing a method of generating a route to a target menu.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of generating a guidance route to a target menu, the route being displayable as a tree structure using an on screen display on of an image processing apparatus, the method including displaying a menu item list that contains names of a plurality of menus is of the image forming apparatus using the on screen display, if a menu item is selected from the menu item list, setting a menu corresponding to the selected menu item is set as a target menu, and establishing a route to the target menu according to the tree structure and simulating menus that belong to the route to the target menu.

The method of generating the guidance route to the target menu may further include storing route information indicating hierarchical relationships of the menus that belong to the route that are established according to the tree structure before the displaying of the menu item list.

The establishing the route to the target menu may include searching for the route to the target menu using the route information, and displaying the simulated menus that correspond to the menus that belong to the route to the target menu according to the hierarchical relationships in the tree structure sequentially.

The simulated menus may be displayed in descending order according to the hierarchical relationships of the tree structure.

Each of the simulated menus may be displayed for a pre-set time period, and after a displayed simulated menu disappears, a next simulated display is displayed.

The establishing of the route to the target menu may further include displaying a location of a function key to execute a menu along with a simulated display each corresponding to a menu belonging to the route to the target menu.

The method of generating the guidance route to the target menu may further include displaying a search box to search for a specific menu item in the menu item list, and searching for a menu item corresponding to the specific menu item that is input through the search box and displaying the specific menu item.

The foregoing and/or other aspects and utilities of the present general inventive concept may also be achieved by providing a image processing apparatus to display menus having a tree structure using an on screen display, the image processing apparatus including a memory to store menu item list information including menu items indicating respective names of the menus, route information indicating hierarchical relationships of the menus according to the tree structure, and simulated menu information corresponding to the menus, a controller to search for a route to a target menu by referring to the route information and to extract route simulated menu information corresponding to menus belonging to the route from the simulated display information, an on screen display processor to receive the route simulated display information corresponding to the menus belonging to the route and the menu item list information, and to output an on screen display signal, and a video display part to receive the on screen display signal from the on screen display processor and to display simulated menus corresponding to the route simulated menu information, and the menu item list.

The image processing apparatus may further include an input terminal having function keys to select the menus according to a user manipulation.

The memory can store function key information that incidates locations of the function keys corresponding to the menus, and the controller extracts route function key information corresponding to the menus belonging to the route from the function key information and provides the extracted information to the OSD display.

The foregoing and/or other aspects and utilities of the present general inventive concept may also be achieved by providing a method of displaying a route to a target menu of an image processing apparatus, the method including designating a menu corresponding to a selected menu name of a displayed menu names list as the target menu, searching for the route to the target menu using route information stored in the image processing apparatus corresponding to the target menu, the route information including a hierarchical listing of one or more menus along the route to the target menu, and simulating and displaying the route to the target menu using the route information.

The method may further include selecting a menu names list option from a displayed list of options, displaying the menu names list, and selecting the menu name from the menu names list. Each of the one or more menus of the hierarchical listing may include a grade, and the one or more menus may be listed in the hierarchical listing in descending order based on the grades.

The simulating and displaying of the route to the target menu may include (a) determining whether a first menu having a highest grade is the target menu, extracting first simulated menu information stored in the image processing apparatus and corresponding to the first menu, and displaying a first simulated menu corresponding to the first simulated menu information for a predetermined period of time, and sequentially repeating operation (a) for each consecutive menu in descending order along the route until a simulated menu corresponding to the target menu has been displayed for the predetermined period of time.

The foregoing and/or other aspects and utilities of the present general inventive concept may also be achieved by providing an image processing apparatus, including a control unit to designate a selected menu as the target menu, and to search for a route to the target menu using route information corresponding to the target menu, the route information including a hierarchical listing of one or more menus along the route to the target menu, a memory unit to store the route information, and a display unit to display one or more simulated menus corresponding to the one or more menus along the route to the target menu.

The image processing apparatus may further include a input unit to provide a command to the control unit to designate the selected menu as the target menu. The control unit may assign each of the one or more menus of the hierarchical listing a grade, and the one or more menus may be listed in the hierarchical listing in descending order based on the grades.

The control unit may determine whether a first menu having a highest grade is the target menu and may extract first simulated menu information stored in the image processing apparatus and corresponding to the first menu, and the display unit may display a first simulated menu corresponding to the first simulated menu information for a predetermined period of time, when the first menu is not the target menu, the control unit may determine whether a second menu having a second highest grade is the target menu and may extract second simulated menu information stored in the image processing apparatus and corresponding to the second menu, and the display unit may display a second simulated menu corresponding to the second simulated menu information for the predetermined period of time, and when the second menu is not the target menu, the display unit may display simulated menus corresponding to each of the remaining menus of the hierarchical listing sequentially in descending order based on the grades until a simulated menu corresponding to the target menu has been displayed for the predetermined period of time.

The foregoing and/or other aspects and utilities of the present general inventive concept may also be achieved by providing an image processing apparatus, including a memory part to store a plurality of menus provided by the image processing apparatus, to store route information including a route to a target menu as a hierarchical tree structure based on grades assigned to each menu of the route, and to store simulated menu information and function key information corresponding to each menu of the route, a control part to search the route information for the route to the target menu in the memory, to extract the simulated menu information and the function key information from the memory, and to identify the target menu, and a display part to display the route to the target menu based on the hierarchical tree structure and under the control of the control part.

The image processing apparatus may further include an input terminal to provide a command to the controller to designate a menu corresponding to an input menu name as the target menu.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
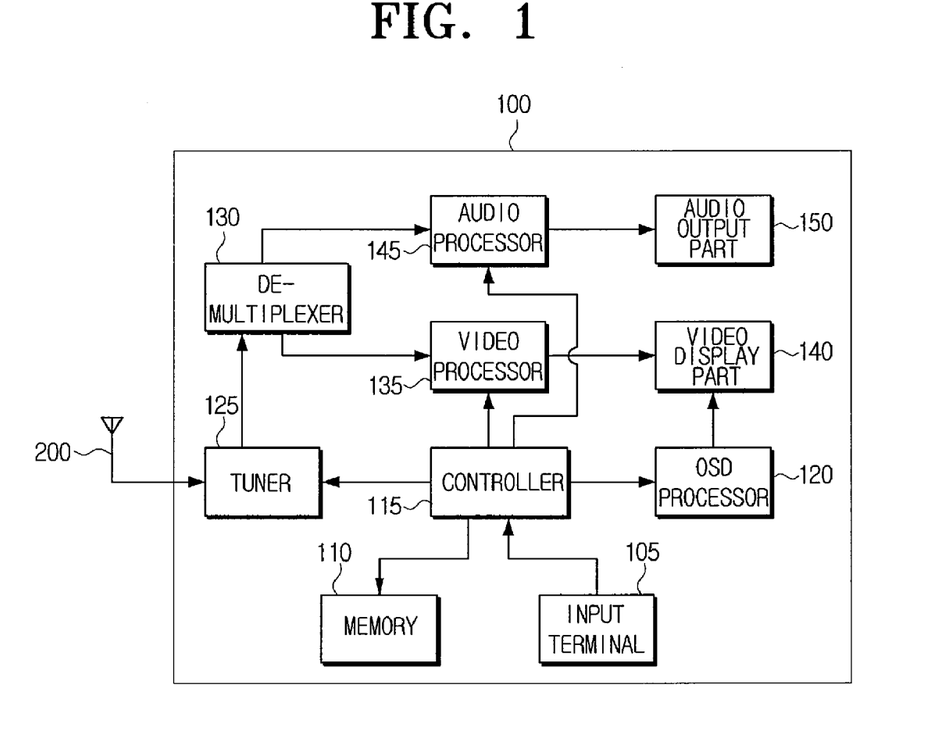
FIG. 1 is a block diagram illustrating a television, according to an embodiment of the present general inventive concept.

FIG. 1 is a block diagram schematically illustrating a television, according to an embodiment of the present general inventive concept.

Referring to FIG. 1, a television 100 according to an embodiment of the present general inventive concept includes an input terminal 105, a memory 110, a controller 115, an on screen display (OSD) processor 120, a tuner 125, a de-multiplexer 130, a video processor 135, a video display part 140, an audio processor 145, and an audio output part 150.

More specifically, the input terminal 105 generates a predetermined command, such as a command to change a channel or a command to adjust a volume of the audio output part 150 according to a user manipulation, and provides the generated command to the controller 115. The input terminal 105 is integrally formed with a body of the television 100 and is provided with function keys (not illustrated) that are manipulated by a user to select various menus provided by the television 100.

Albeit not illustrated, the television 100 may further include a remote controller to generate a predetermined command according to a user manipulation like the input terminal 105 and to provide the generated command to the controller 115.

The memory 110 stores various data that are necessary to operate the television 100. For example, the memory 110 stores information about a quality of an image of the television 100, menu item list information, route information, simulated menu information, and function key information indicating respective locations of the function keys corresponding to the various menus provided by the television 100.

More specifically, the menu item list information indicates respective names of the various menus provided by the television 100. The simulated menu information indicates respective simulated menus corresponding to the various menus. The function key information indicates respective locations of the function keys corresponding to the various menus.

The route information indicates respective routes the television 100 uses to access the various menus and is generated based on a tree structure. That is, the various menus have a hierarchical relationship with each other, and the various menus are arranged in the tree structure according to grades such that menus having a higher grade are located higher in the tree structure and are therefore accessible before menus having a lower grade located lower in the tree structure. The route information includes information about the hierarchical relationships of the various menus that are established according to the tree structure and grade information of the various menus.

The controller 115 generates a control signal to control the tuner 125, the memory 110, the OSD processor 120, the video processor 135, and the audio processor 145 according to the command received from the input terminal 105, and provides the control signal to a corresponding component of the television 100.

For example, the controller 115 searches for a route through the hierarchy of the various menus to a target menu by referring to the route information stored in the memory 110. The controller 115 extracts the simulated menu information and the function key information that correspond to the searched route from the memory 110, and provides the extracted simulated menu information and the function key information to the OSD processor 120. In particular, the controller 115 extracts the simulated menu information and function key information sequentially for each of the various menus along the route to the target menu, including a simulated menu information and function key information corresponding to the target menu. The simulated menus provided to the OSD processor are simulated displays to display the route to the target menu, and not actual displays to activate a corresponding menu and execute a certain function of the corresponding menu.

The OSD processor 120 receives information from the memory 110 according to the control signal received from the controller 115 and generates an OSD signal including an OSD menu, and provides the generated OSD signal to the video display part 140. The information received from the memory 110 includes the information about the quality of the image, the menu item list information and the simulated menu information of the searched route.

The tuner 125 sets a channel selected from a plurality of channels by the input terminal 105 to an input channel, receives a broadcast signal 200 corresponding to the input channel through an external antenna, and provides the broadcast signal to the de-multiplexer 130.

The de-multiplexer 130 divides the broadcast signal received from the tuner 125 into a video signal and an audio signal.

The video processor 135 decodes the video signal received from the de-multiplexer 130 and provides the decoded signal to the video display part 140.

The video display part 140 receives the decoded video signal from the video processor 135, displays a image, receives the OSD signal from the OSD processor 120, displays an OSD text.

The audio processor 145 decodes the audio signal received from the de-multiplexer 130 and provides the decoded signal to the audio output part 150, and the audio output part 150 outputs a sound corresponding to the audio signal.

Figure 2:
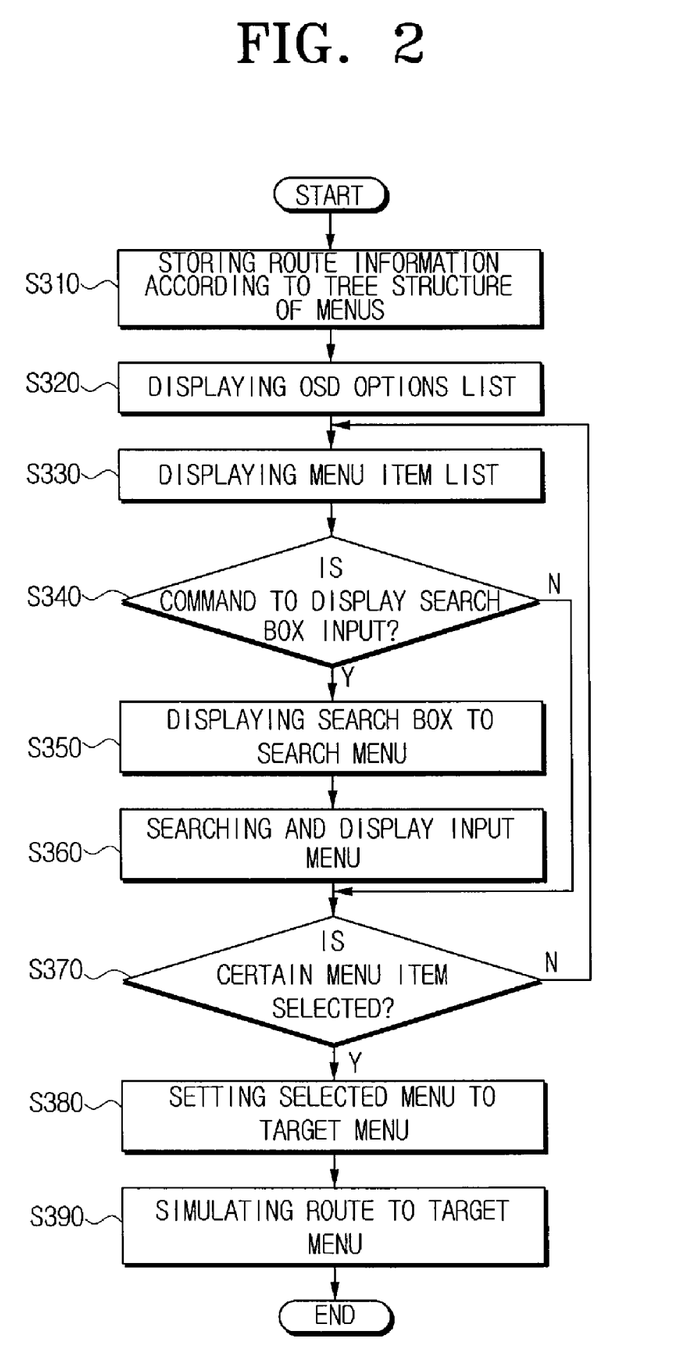
FIG. 2 is a flowchart illustrating a method of generating a route to a target menu of the television of FIG. 1, according to an embodiment of the present general inventive concept.
Figure 3:
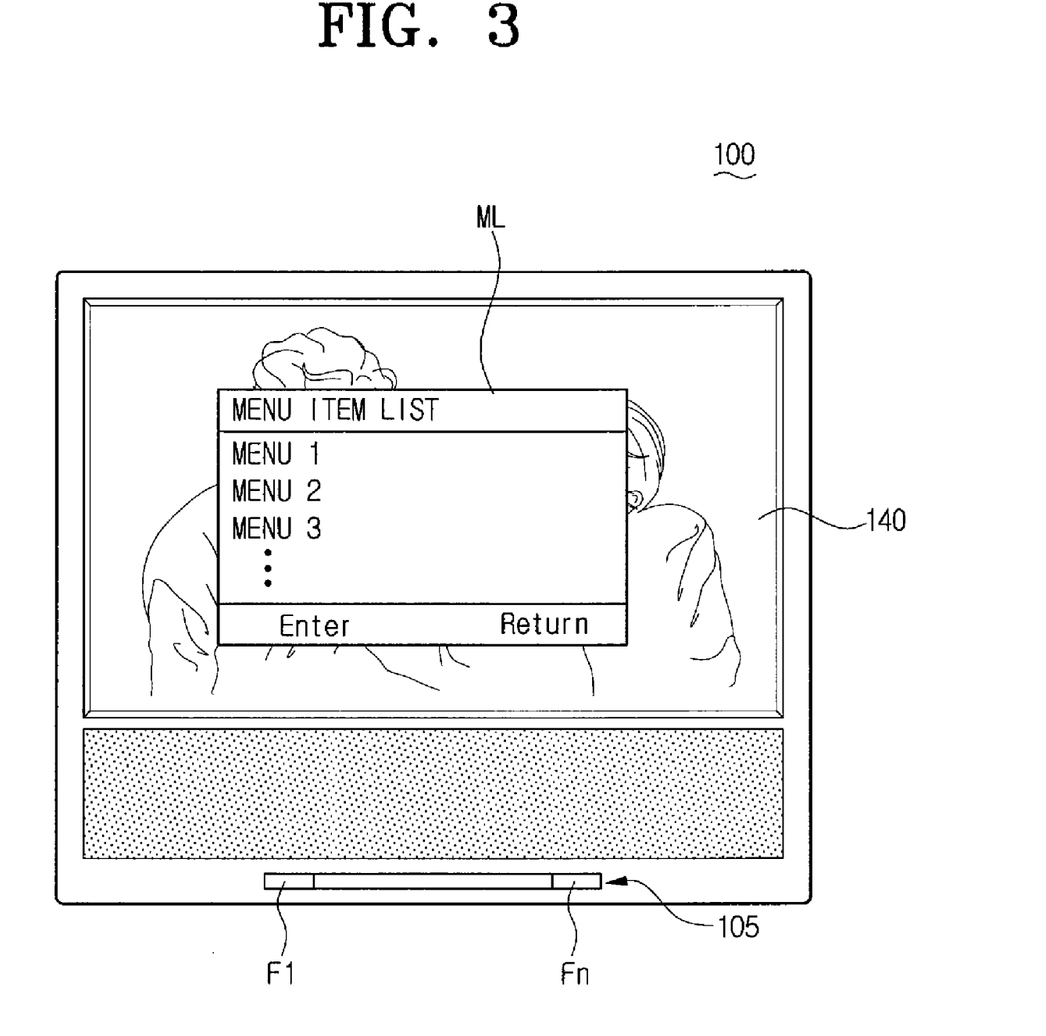
FIG. 3 is a view illustrating one example of a menu item list displayed on the television of FIG. 1, according to an embodiment of the present general inventive concept.

FIG. 2 is a flowchart illustrating a method of generating a route to a target menu of the television 100 of FIG. 1, according to an embodiment of the present general inventive concept, and FIG. 3 is a view illustrating one example of a menu item list displayed on the television 100 of FIG. 1, according to an embodiment of the present general inventive concept.

Referring to FIGS. 1 to 3, the controller 115 stores the route information indicating the hierarchical relationships of the menus and the function key information to the memory 110 at operation S310. Alternatively, the route information and the function key information may be previously stored at the memory 110 during an operation of storing the menus, as opposed to being stored at the memory 110 by the controller 115.

The controller 115 generates a control signal to display an OSD options list (which may include an option to display a menu item list) according to a command received from the input terminal 105, and transmits the control signal to the OSD processor 120. The OSD processor 120 provides the OSD options list to the video display part 140 according to the control signal received from the controller 115, and the video display part 140 displays the OSD options list at operation S320.

The controller 115 extracts the menu item list information from the memory 110 and provides the extracted menu item list information to the OSD processor 120 if an option to display a menu item list is selected from the OSD options list according to a user manipulation. The OSD processor 120 converts the received menu item list information into an OSD signal and provides the OSD signal to the video display part 140, and the video display part 140 displays the menu item list as illustrated in FIG. 3 at operation S330. The menu item list ML is a set of menu items indicating the respective names of the various menus provided by the television 100.

The controller 115 can determine whether a command to display a search box is received from the input terminal 105 according to a user manipulation at operation S340. If the command to display a search box is received at operation S340, the OSD processor 120 displays a search box on the video display part 140 to enable a user to search for a specific menu item in the menu item list at operation S350. The controller 115 searches the menu item list and displays the specific menu item corresponding to the menu item input by the user through the search box on the video display part 140 at operation S360.

If the command to display a search box is not received at operation S340, or after the controller displays the searched menu item at operation S360, the controller 115 determines whether a certain menu item is selected from the menu item list according to a user manipulation at operation S370.

If the certain menu item is not selected from the menu item list at operation S370, the menu item list remains in a current state at operation S330.

If the certain menu item is selected from the menu item list at operation S370, the controller 115 sets a menu corresponding to the selected menu item as a target menu at operation S380.

The controller 115 searches for a route to the target menu and the video display part 140 displays simulated menus belonging to the searched route to the target menu at operation S390. A process of displaying the simulated menus belonging to the searched route according to an embodiment of the present general inventive concept will be described below in detail with reference to FIG. 4.

Figure 4:
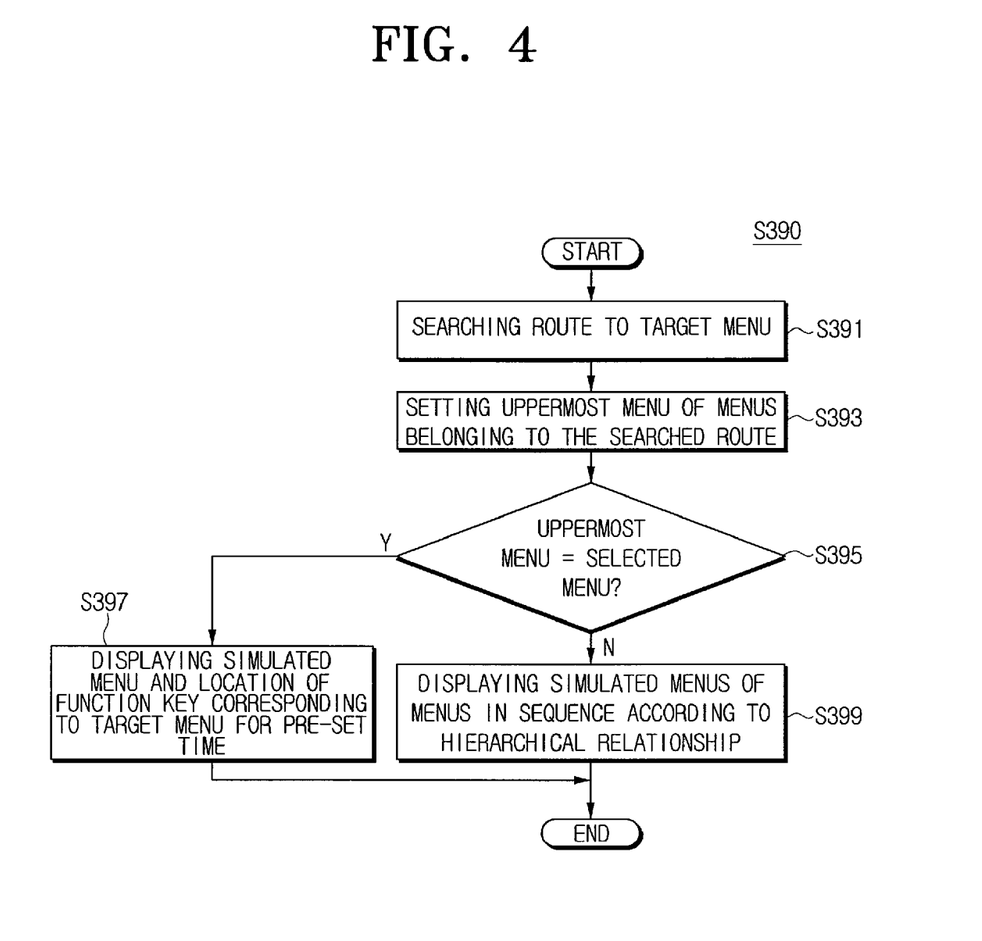
FIG. 4 is a flowchart illustrating a process of simulating a route to a target menu of FIG. 2, according to an embodiment of the present general inventive concept.

FIG. 4 is a flowchart illustrating a process of simulating the route to the target menu of FIG. 2, according to an embodiment of the present general inventive concept.

Referring to FIGS. 1 and 4, the controller 115 searches for the route to the target menu by referring to the route information stored in the memory 110 at operation S391. The route to the target menu includes various menus that have a grade higher than a grade of the target menu and that have a hierarchical relationship with the target menu, and also includes the target menu.

The controller 115 sets the highest-grade menu of the various menus belonging to the searched route as an uppermost menu at operation S393.

The controller 115 determines whether the uppermost menu is the target menu at operation S395.

If the uppermost menu is the target menu at operation S395, the controller 115 extracts simulated menu information corresponding to the target menu and location information of a function key corresponding to the target menu from the memory 110, and transmits the extracted information to the OSD processor 120. The OSD processor 120 converts the received simulated menu information and the location information of the function key into an OSD signal and provides the OSD signal to the video display part 140. The video display part 140 displays the simulated menu and the location of the function key corresponding to the target menu for a pre-set time period at operation S397. The pre-set time period is set by a system manager during a process of generating the route information or by a user. If the uppermost menu is the target menu, there is no menu having a higher grade than the grade of the target menu. Accordingly, only the simulated display corresponding to the target menu is displayed, as there is no other menu higher on the hierarchical tree structure for the route to the target menu.

If the uppermost menu is not the target menu at operation S395, simulated menus corresponding to menus belonging to the searched route to the target menu are displayed in sequence of their grades, with a menu having a higher grade being displayed before a menu having a lower grade, at operation S399. A process of displaying the simulated menus according to the grades of the corresponding menus, according to an embodiment of the present general inventive concept, will be described below in detail with reference to FIG. 5.

As described above, the television 100 displays a simulated menu corresponding to the target menu and simulated menus corresponding to all menus that have a hierarchical relationship with the target menu in sequence of grades based on route information, thus having a small amount of data in rotation. Accordingly, since it is possible for the television 100 to briefly display a location and a function for each menu without having to increase a capacity of the memory 110, a manufacturing cost can be reduced and a user's convenience can be improved.

Figure 5:
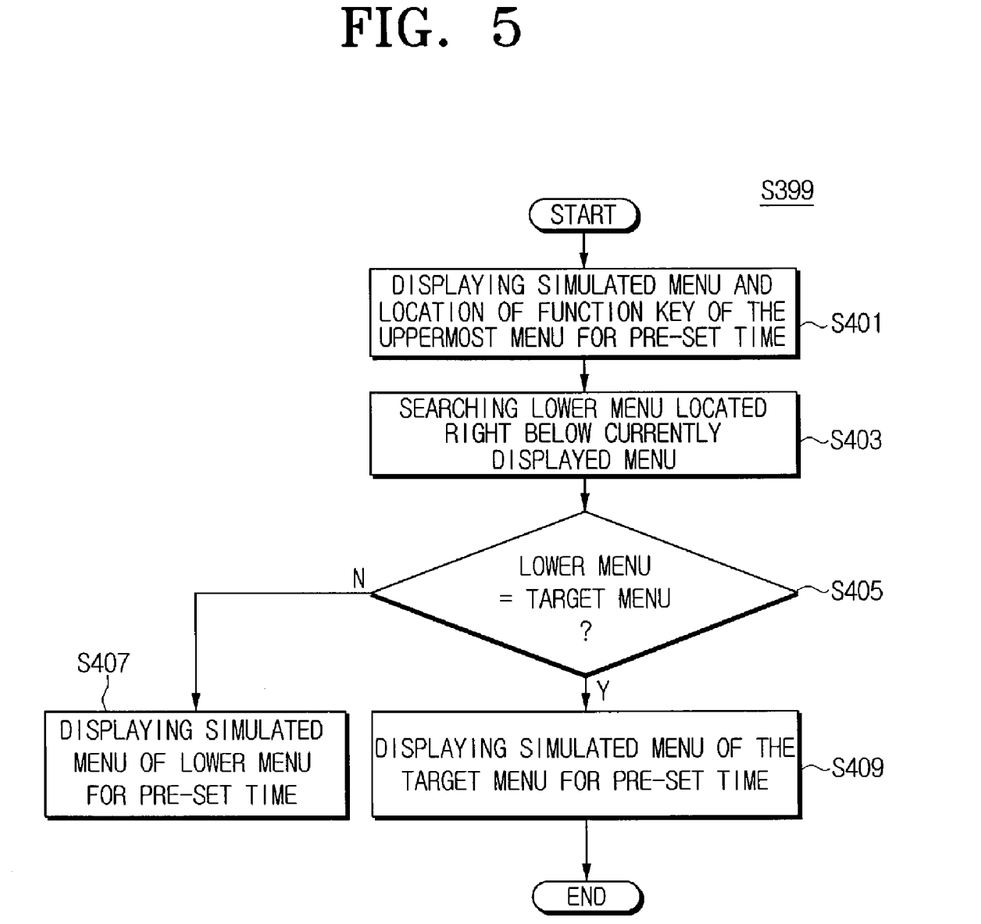
FIG. 5 is a flowchart illustrating a process of displaying simulated menus of FIG. 4 according to their hierarchical relationships, according to an embodiment of the present general inventive concept.

FIG. 5 is a flowchart illustrating the process of displaying the simulated menus of menus according to the hierarchical relationships thereof of FIG. 4, according to an embodiment of the present general inventive concept.

Referring to FIG. 5, the OSD processor 120 provides the simulated menu information and the function key information of the uppermost menu that are extracted from the memory 110 to the video display part 140, and the video display part 140 displays the simulated menu and the location of the function key that correspond to the uppermost menu for a pre-set time period at operation S401.

Next, the controller 115 searches for a next lower menu belonging to the route, which has a grade lower than the grade of the menu corresponding to the currently displayed simulated menu (which in this case is the uppermost menu) and which is located right below the menu corresponding to the simulated menu currently displayed on the video display part 140 (which in this case is the uppermost menu) in the hierarchical tree structure, at operation S403.

The controller 115 determines whether the searched next lower menu is the target menu at operation S405.

If the next lower menu is not the target menu at operation S405, the controller 115 extracts simulated menu information and function key information that correspond to the next lower menu from the memory 110 and provides the extracted information to the OSD processor 120. The OSD processor 120 provides the simulated menu information and the function key information of the next lower menu received from the controller 115 as an OSD signal to the video display part 140, and the video display part 140 displays a simulated menu and a location of the function key that correspond to the next lower menu for a pre-set time period at operation S407. The operations S403 to S407 are repeated until the next lower menu searched at the operation S403 is the target menu.

If the next lower menu is the target menu, the controller 115 extracts the simulated menu information and the function key information that correspond to the target menu from the memory 110 and provides the extracted information to the OSD processor 120 at operation S405. The OSD processor 120 provides the simulated menu information and the function key information of the target menu as an OSD signal to the video display part 140, and the video display part 140 displays a simulated menu and a location of the function key that correspond to the target menu for a pre-set time period at operation S409.

According to this embodiment of the present general inventive concept, the simulated menus are displayed one after another such that after a current simulated menu disappears, a next simulated menu appears. A speed at which the simulated menus are displayed and/or disappear can vary, and can be either immediate or after a predetermined amount of time. Furthermore, the speed at which one simulated menu is displayed and/or disappears with respect to one or more other simulated menus can also vary, and thus speeds at which various simulated menus are displayed and/or disappear are not required to be identical.

As described above, the television 100 searches the route to the target menu using the route information and displays the simulated menus of the menus belonging the route in the sequence of grades and the hierarchical tree structure.

Since it is possible for the television 100 to briefly display the location and the function of the target menu through the simulated menus, the television 100 can effectively provide a user with guiding information about the various menus provided by the television 100. Accordingly, since the television 100 provides the guiding information about the various menus to the user without requiring a separate instruction manual or manual CD, the user's convenience can be improved.

Hereinafter, a process of guiding a user to a location of a target menu by sequentially displaying simulation menus corresponding to menus belonging to a route to the target menu is described in detail with reference to FIG. 6, according to an embodiment of the present general inventive concept.

Figure 6:
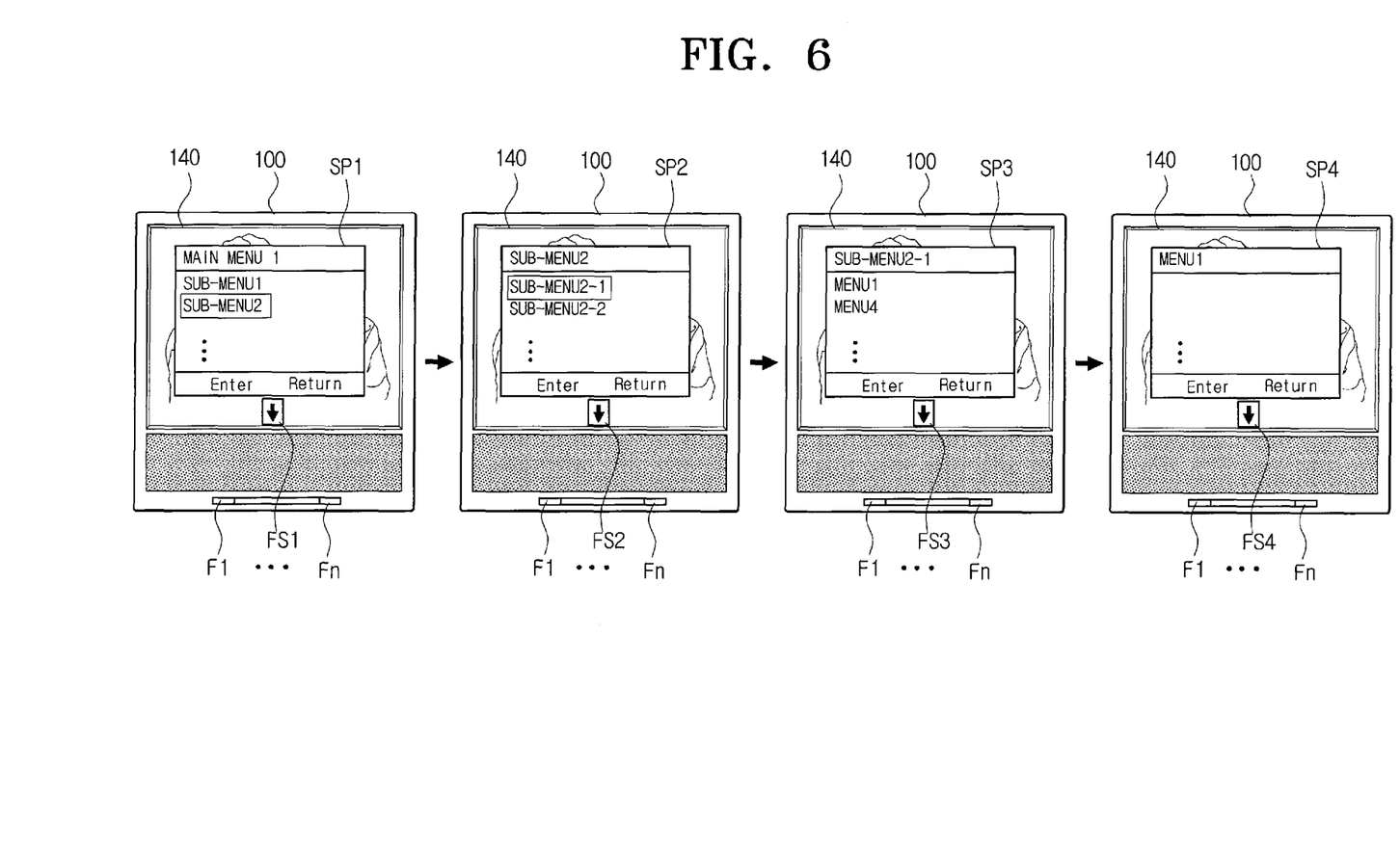
FIG. 6 is a view illustrating images of the television of FIG. 1 to simulate a route to a target menu, according to an embodiment of the present general inventive concept.

FIG. 6 is a view illustrating displays to display the route to the target menu 1 of the television of FIG. 1, according to an embodiment of the present general inventive concept.

Referring to FIGS. 3 and 6, the video display part 140 displays the menu item list ML (see FIG. 3) containing menu items according to a user manipulation.

If a menu 1 is selected from the menu item list ML (see FIG. 3), the controller 115 (see FIG. 1) searches a route to the menu 1 by referring to route information stored in the memory 110 (see FIG. 1). As illustrated in FIG. 6, there are menus higher than the menu 1, such as a main menu 1, a sub-menu 2, and a sub-menu 2-1, on a hierarchical tree structure of the route to the menu 1. The main menu 1 is located at the highest position on the hierarchical tree structure on the route to the menu 1, and thus the main menu 1 is the uppermost menu having the highest grade. Grades decrease from the main menu 1 to the sub-menu 2, to the sub-menu 2-1, and to the menu 1.

According to the searched route, the video display part 140 displays a simulated menu SP1 corresponding to the main menu 1 and a location of a function key FS1 of function keys F1, . . . , Fn provided on the input terminal 105 (n is a natural number greater than 1) that corresponds to the main menu 1.

The video display part 140 displays the simulated menu SP1 of the main menu 1 for a pre-set time period, and then the video display part 140 displays a simulated menu SP2 and a location FS2 of function key that correspond to the sub-menu 2.

The video display part 140 displays the simulated menu SP2 of the sub-menu 2 for a pre-set time period, and then the video display part 140 displays a simulated menu SP3 and a location FS3 of function key that correspond to the sub-menu 2-1.

The video display part 140 displays the simulated menu SP3 of the sub-menu 2-1 for a pre-set time period, and then the video display part 140 displays a simulated menu SP4 and a location FS4 of function key that correspond to the menu 1, which is the target menu, for a pre-set time period.

According to the present general inventive concept as described above, an image processing apparatus (e.g., a television) stores route information generated based on hierarchical relationships of various menus provided by the image processing apparatus according to a tree structure, and briefly displays locations and functions of each of the menus of the tree structure using the route information through simulated menus. Accordingly, since it is possible for the image display apparatus (e.g., the television) to provide guiding information about menus provided by the image processing apparatus to a user effectively without requiring a separate instruction manual or manual CD, the user's convenience can be improved.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of generating a guidance route to a target menu, the route being displayable as a tree structure using an on screen display image of an image processing apparatus, the method comprising:
    displaying a menu item list that contains names of a plurality of menus of the image processing apparatus using the on screen display;
    if a menu item is selected from the menu item list, setting a menu corresponding to the selected menu item as a target menu; and
    establishing a route to the target menu according to the tree structure and simulating menus that belong to the route to the target menu,
    wherein each of the simulated menus is displayed for a pre-set time period, and after a displayed simulated menu disappears a next simulated menu is displayed.

2. The method of generating the guidance route to the target menu as claimed in claim 1, further comprising:
    storing route information indicating hierarchical relationships of the menus that belong to the route that are established according to the tree structure before the displaying of the menu item list.

3. The method of generating the guidance route to the target menu as claimed in claim 2, wherein the establishing of the route to the target menu comprises:
    searching for the route to the target menu using the route information; and
    displaying the simulated menus that correspond to the menus that belong to the route to the target menu according to the hierarchical relationships in the tree structure sequentially.

4. The method of generating the guidance route to the target menu as claimed in claim 3, wherein the simulated menus are displayed in descending order according to the hierarchical relationships of the tree structure.

5. The method of generating the guidance route to the target menu as claimed in claim 3, wherein the establishing of the route to the target menu further comprises:
    displaying a location of a function key to execute a menu along with a simulated menu each corresponding to a menu belonging to the route to the target menu.

6. The method of generating the guidance route to the target menu as claimed in claim 1, further comprising:
    displaying a search box to search for a specific menu item in the menu item list; and
    searching for a menu item corresponding to the specific menu item that is input through the search box and displaying the specific menu item.

7. A image processing apparatus to display menus having a tree structure using an on screen display, the image processing apparatus comprising:
    a memory to store menu item list information including menu items indicating respective names of the menus, route information indicating hierarchical relationships of the menus according to the tree structure, and simulated menu information corresponding to the menus;
    a controller to search for a route to a target menu by referring to the route information and to extract route simulated menu information corresponding to menus belonging to the route from the simulated menu information;
    an on screen display processor to receive the route simulated menu information corresponding to the menus belonging to the route and the menu item list information, and to output an on screen display signal; and
    a video display part to receive the on screen display signal from the on screen display processor and to display simulated menus corresponding to the route simulated menu information, and the menu item list.

8. The image processing apparatus as claimed in claim 7, further comprising:
an input terminal having function keys to select the menus according to a user manipulation.

9. The image processing apparatus as claimed in claim 8, wherein the memory stores function key information that indicates locations of the function keys corresponding to the menus, and the controller extracts route function key information corresponding to the menus belonging to the route from the function key information and provides the extracted information to the OSD display.

10. A method of displaying a route to a target menu of an image processing apparatus, the method comprising:
designating a menu corresponding to a selected menu name of a displayed menu names list as the target menu;
searching for the route to the target menu using route information stored in the image processing apparatus corresponding to the target menu, the route information including a hierarchical listing of one or more menus along the route to the target menu; and
simulating and displaying the route to the target menu using the route information,
wherein each of the simulated menus is displayed for a predetermine time period, and after a displayed simulated menu disappears a next simulated menu is displayed.

11. The method of displaying the route to the target menu as claimed in claim 10, further comprising:
selecting a menu names list option from a displayed list of options;
displaying the menu names list; and
selecting the menu name from the displayed menu names list.

12. The method of displaying the route to the target menu as claimed in claim 10, wherein each of the one or more menus of the hierarchical listing includes a grade, and the one or more menus are listed in the hierarchical listing in descending order based on the grades.

13. The method of displaying the route to the target menu as claimed in claim 12, wherein the simulating and displaying of the route to the target menu comprises:
(a) determining whether a first menu having a highest grade is the target menu, extracting first simulated menu information stored in the image processing apparatus and corresponding to the first menu, and displaying a first simulated menu corresponding to the first simulated menu information for the predetermined period of time; and
(b) sequentially repeating operation (a) for each consecutive menu in descending order along the route until a simulated menu corresponding to the target menu has been displayed for the predetermined period of time.

14. An image processing apparatus, comprising:
a control unit to designate a selected menu as the target menu, and to search for a route to the target menu using route information corresponding to the target menu, the route information including a hierarchical listing of one or more menus along the route to the target menu;
a memory unit to store the route information; and
a display unit to display one or more simulated menus corresponding to the one or more menus along the route to the target menu,
wherein each of the one or more simulated menus is displayed for a pre-set time period, and after a displayed simulated menu disappears a next simulated menu is displayed.

15. The image processing apparatus as claimed in claim 14, further comprising:
a input unit to provide a command to the control unit to designate the selected menu as the target menu.

16. The image processing apparatus as claimed in claim 14, wherein the control unit assigns each of the one or more menus of the hierarchical listing a grade, and the one or more menus are listed in the hierarchical listing in descending order based on the grades.

17. The image processing apparatus as claimed in claim 16, wherein
the control unit determines whether a first menu having a highest grade is the target menu and extracts first simulated menu information stored in the image processing apparatus and corresponding to the first menu, and the display unit displays a first simulated menu corresponding to the first simulated menu information for the predetermined period of time;
when the first menu is not the target menu, the control unit determines whether a second menu having a second highest grade is the target menu and extracts second simulated menu information stored in the image processing apparatus and corresponding to the second menu, and the display unit displays a second simulated menu corresponding to the second simulated menu information for the predetermined period of time; and
when the second menu is not the target menu, the display unit displays simulated menus corresponding to each of the remaining menus of the hierarchical listing sequentially in descending order based on the grades until a simulated menu corresponding to the target menu has been displayed for the predetermined period of time.

18. An image processing apparatus, comprising:
a memory part to store a plurality of menus provided by the image processing apparatus, to store route information including a route to a target menu as a hierarchical tree structure based on grades assigned to each menu of the route, and to store simulated menu information and function key information corresponding to each menu of the route;
a control part to search the route information for the route to the target menu in the memory, to extract the simulated menu information and the function key information from the memory, and to identify the target menu; and
a display part to display the route to the target menu based on the hierarchical tree structure and under the control of the control part,
wherein the display part displays each of the simulated menus for a predetermined time period, and after a displayed simulated menu disappears a next simulated menu is displayed.

19. The image processing apparatus as claimed in claim 18, further comprising:
an input terminal to provide a command to the controller to designate a menu corresponding to an input menu name as the target menu.

20. A method of displaying menus of an image processing apparatus having a tree structure using an on screen display, the method comprising:

storing menu item list information including route information indicating hierarchical relationships of the menus according to the tree structure, and simulated menu information corresponding to the menus in a memory;

searching for a route to a target menu with the route information, and extracting route simulated menu information corresponding to menus belonging to the route from the simulated menu information with a controller of the image processing apparatus; and displaying simulated menus corresponding to the route simulated menu information and the menu item list information on a display of the image processing apparatus, wherein each of the simulated menus is displayed for a predetermined time period, and after a displayed simulated menu disappears a next simulated menu is displayed.

21. A method of displaying menus of an image processing apparatus, the method comprising:

setting a selected menu as a target menu with a control unit of the image processing apparatus;

determining a route to the target menu using route information corresponding to the target menu with a control unit of the image processing apparatus, the route information including a hierarchical listing of one or more menus along the route to the target menu; and generating and displaying one or more simulated menus corresponding to the one or more menus along the route to the target menu on a display of the image processing apparatus, wherein each of the simulated menus is displayed for a pre-set time period, and after a displayed simulated menu disappears a next simulated menu is displayed.

* * * * *